United States Patent
Mariani et al.

(10) Patent No.: US 7,570,032 B2
(45) Date of Patent: Aug. 4, 2009

(54) REGULATOR WITH INTEGRATOR IN FEEDBACK SIGNAL

(75) Inventors: Adalberto Mariani, Garlasco (IT); Silvio Pepino, Aosta (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 338 days.

(21) Appl. No.: 11/548,996

(22) Filed: Oct. 12, 2006

(65) Prior Publication Data

US 2007/0085522 A1    Apr. 19, 2007

(30) Foreign Application Priority Data

Oct. 17, 2005    (EP) .................................. 05425725

(51) Int. Cl.
*G05F 1/613* (2006.01)
*G05F 1/00* (2006.01)
(52) U.S. Cl. .................. 323/224; 323/287; 323/288
(58) Field of Classification Search ............... 323/224, 323/287, 293, 288
See application file for complete search history.

(56) References Cited

U.S. PATENT DOCUMENTS

| | | | |
|---|---|---|---|
| 5,959,443 A | 9/1999 | Littlefield | |
| 6,215,288 B1 | 4/2001 | Ramsey et al. | |
| 7,102,337 B2 * | 9/2006 | Wheeler et al. | 323/282 |
| 7,122,996 B1 * | 10/2006 | Huang | 323/288 |

OTHER PUBLICATIONS

European Search Report EP 05 42 5725; Apr. 4, 2006.

\* cited by examiner

*Primary Examiner*—Shawn Riley
(74) *Attorney, Agent, or Firm*—Hogan & Hartson LLP

(57) ABSTRACT

A control device for a switching converter has an input terminal and an output terminal; the converter includes a half-bridge of a first and a second transistor coupled between the input terminal and a reference voltage. The control device detects a signal on the output terminal of the converter, integrates the detected signal and imposes a predefined minimum frequency of the detected signal. The control device regulates the average value of the detected signal by comparison with a reference signal and drives the first and second transistors in during the regulation. The control device turns off an integrator when the predefined minimum frequency is imposed.

20 Claims, 11 Drawing Sheets

REGULATOR WITH INTEGRATOR IN FEEDBACK SIGNAL

RELATED APPLICATION

The present application claims priority of European Patent Application No. 05425725.8 filed Oct. 17, 2005, which is incorporated herein in its entirety by this reference.

FIELD OF THE INVENTION

The present invention refers to a control device for a switching converter and relative switching converter, preferably a converter from direct voltage to direct voltage.

BACKGROUND OF THE INVENTION

In the state of the art converters from direct voltage to direct voltage or DC-DC converters are generally known; a switching converter with controller in pulse frequency mode and with a constant turn-on time is shown in FIG. 1. The converter comprises a first MOS transistor HS having a non-drivable terminal coupled to an input voltage Vin and another non-drivable terminal coupled to a terminal of an inductance L and to a non-drivable terminal of another MOS transistor LS having the other non-drivable terminal coupled to ground GND. The inductance L has its other terminal coupled to a sense resistance Rsense in turn coupled to a filter 1 constituted by a resistance ESR in series to a capacitor Cout where the resistance ESR is the parasitic resistance of the capacitor Cout; the filter 1 is placed in parallel to the load LOAD. The converter comprises a control circuit 2 having in input on the terminals CSENSEPLUS and CSENSEMINUS the current detected at the terminals of the resistance Rsense, the output voltage Vout at the terminals of the load LOAD on the input terminal VFB, a reference voltage VREF and the clock pulses MIN_FREQ coming from a timer 3; said control circuit 2 is suitable for driving the transistors HS and LS by means of the drive signals HSIDE and LSIDE through buffers 81 and 82.

In FIG. 2 the control circuit 2 is shown in more detail. Said circuit comprises a comparator 21 suitable for comparing the voltage Vout, present on the terminal VFB, with the voltage VREF, a comparator 22 having the input terminals coinciding with the terminals CSENSEPLUS and CSENSEMINUS and suitable for detecting the zero crossing of the current that flows through the inductance L and three set-reset flip-flops 23-25 in which the flip-flop 23 has the input set S coupled with the output of the comparator 21, the flip-flop 24 has the input reset R coupled with the output of the comparator 22 and the flip-flop 25 has the input set S coupled with the output of the oscillator 3. The outputs of the flip-flops 23 and 24 are respectively the drive signals HSIDE and LSIDE for the transistors HS and LS. The circuit 2 also comprises a timer 26 which when the input is at a low logic level has a low output. Initially the set reset flip-flops 23 and 25 are reset while the flip-flop 24 is set. When the signal Vout falls below the value VREF the comparator 21 sets the flip-flop 23; in this manner the signal HSIDE is raised while the signal LSIDE is lowered and the voltage Vout rises above the value of the voltage VREF. After a period given by the turn-on time Ton of the transistor HS the timer 26 changes the output signal taking it to a high logic level; said signal resets the flip-flop 23 which in turn lowers the signal HSIDE and raises the signal LSIDE. In these operating conditions, that is for loads exceeding half the ripple on the current IL in pulse width modulation, the period Tp of repetition of the charge transfer cycles in output in the converters is equal to Ton*Vin/Vout. FIG. 3 shows the time diagrams of the voltages Vout and VREF, of the current IL on the inductance L and of the signals HSIDE and LSIDE.

In the case that the load LOAD absorbs low value currents, for example of the order of milliamperes, it can happen that the current IL that flows in the inductance L becomes negative during the turn-off period Toff of the transistor HS; in this case the comparator 22 resets the flip-flop 24 so as to lower the signal LSIDE. In this manner the half-bridge constituted by the transistors LS and HS is left at high impedance to prevent the inversion of the sign of the current and the output voltage Vout is discharged on the load LOAD. When the voltage Vout falls below the value of VREF the flip-flop 24 is set and the previous cycle is repeated with the turn-on of the transistor HS; the control circuit 2 works in pulse frequency mode. The control circuit 2 can also comprise a timer 27 suitable for establishing the minimum turn-off time Toff of the transistor HS; in this manner the stability is ensured in regard to the noise induced by the switching of the transistors HS and LS.

In the case of low load and in the presence of pulse frequency modulation a charge $$Q = \frac{1}{2}\frac{Vin - Vout}{L}Ton(Ton + Toff) = \frac{1}{2}\frac{Vin - Vout}{L}\frac{Vin}{Vout}Ton^2$$

is transferred at every cycle. The frequency fp of repetition of the charge transfer cycles in output in the converters is directly proportional to the current on the load Iload because fp=Q/Iload; if said current becomes low the frequency fp can return within the range of frequencies audible by humans. For this reason the converter has a device for limiting the minimum frequency; said device is implemented by the timer 3. When in the conditions of detection of negative current IL and consequent lowering of the signals HSIDE and LSIDE, the timer 3 prevents the pulse period Tp, inverse of the frequency fp, from exceeding a predefined value Tpmax by sending a pulse to the set input of the flip-flop 25 which, in turn, sends a signal on the set input of the flip-flop 24 to raise the value of the signal LSIDE. When the voltage Vout falls below the value VREF the flip-flop 25 is reset. In FIG. 4 the course of the voltage Vout, of the current IL and of the signals HSIDE, LSIDE and MIN-FREQ if the flip-flop 25 is activated can be seen.

A converter of this type suffers from an error in direct current given by half of the ripple on the output signal Vout; this comes about because the regulation is carried out on the minimum value of the voltage Vout. An integrator can be inserted whose object is to correct said error, as shown in FIG. 5. The integrator 4 comprises a transconductance amplifier 41 having the inverting input coupled to the reference voltage VREF and the non-inverting input coupled to the voltage Vout. The integrator comprises a capacitor Cint coupled between the voltage Vout and the output terminal of the amplifier 41 coupled to the control circuit 2 so that the voltage VFB is $$VFB = \frac{Gm}{sCint}(Vout - Vref) + Vout$$

where Gm is the transconductance gain of the amplifier 41. In this case the comparator 21 compares the voltage VREF with the voltage VFB. To reach the stationary state the average of the voltage Vout within a cycle must be constant. Given that the comparator PWM compares the voltage VFB with the voltage VREF the time average of the voltage VFB must also be constant and therefore Vout=VREF must be direct. The regulation that is operated on the signal VFB is on the minimum values of the signal or valley of the signal VFB.

If the load LOAD absorbs low value currents the regulation on the signal Vout is made on the average value. After a cycle of turn-on time Ton and turn-off time Toff in which the current IL goes to zero, the output voltage Vout is overloaded in relation to the value VREF. While the output voltage remains above the regulated value VREF, integrator 4 raises the voltage VFB. When the load LOAD brings the output voltage below the voltage VREF, the voltage VFB decreases until it reaches the voltage VREF and the comparator 21 is triggered, as can be seen in the time diagrams of FIG. 6.

Nevertheless it is possible that, should the converter be applied to a low load LOAD, the output voltage Vout and the current Il start to oscillate and diverge, that is the circuit results unstable. Said instability is due to the delay of the integrator; when the signal MIN_FREQ is sent, the flip-flop 25 turns on the transistor LS raising the signal LSIDE. The turn-off of the transistor LS is no longer bound to the output voltage but to the voltage VFB. The additional contribution caused by the integrator can introduce a certain delay in the turn-off of the transistor LS and thus enable the loading of a negative current of a certain value in the inductance, with consequent charge transient in the successive cycles; this can lead to the triggering of diverging oscillations on the output, as can be seen in the time diagrams of FIG. 7.

SUMMARY OF THE INVENTION

In view of the state of the art described, an embodiment of the present invention provides a control device of a switching converter that overcomes the above-mentioned deficiencies.

In accordance with an embodiment of the present invention, a control device for a switching converter has an input terminal and an output terminal, said converter comprising a half-bridge of a first and a second transistor coupled between the input terminal and a reference voltage, said control device comprising means capable of detecting a signal on the output terminal of the converter, first means suitable for integrating the detected signal and second means suitable for imposing a predefined minimum frequency of the detected signal, said control device being suitable for carrying out a regulation on the average value of said detected signal by comparison with a further reference signal and being suitable for driving said first and second transistor in function of said regulation, characterized in that it comprises further means suitable for unfiring said first means when said second means are active.

In accordance with a further embodiment of the present invention, a switching converter has an input terminal, an output terminal, a half-bridge of a first and a second transistor coupled between the input terminal, a reference voltage, and a control device comprising means capable of detecting a signal on the output terminal of the converter, first means suitable for integrating the detected signal and second means suitable for imposing a predefined minimum frequency of the detected signal, said control device being suitable for carrying out a regulation on the average value of said signal detected by comparison with a further reference signal and being suitable for driving said first and second transistor in function of said regulation, characterized in that said control device comprises further means suitable for turning off said first means when said second means are active.

BRIEF DESCRIPTION OF THE DRAWINGS

The characteristics and the advantages of the present invention will appear evident from the following detailed description of an embodiment thereof, illustrated as non-limiting example in the enclosed drawings, in which.

DETAILED DESCRIPTION

Figure 1:
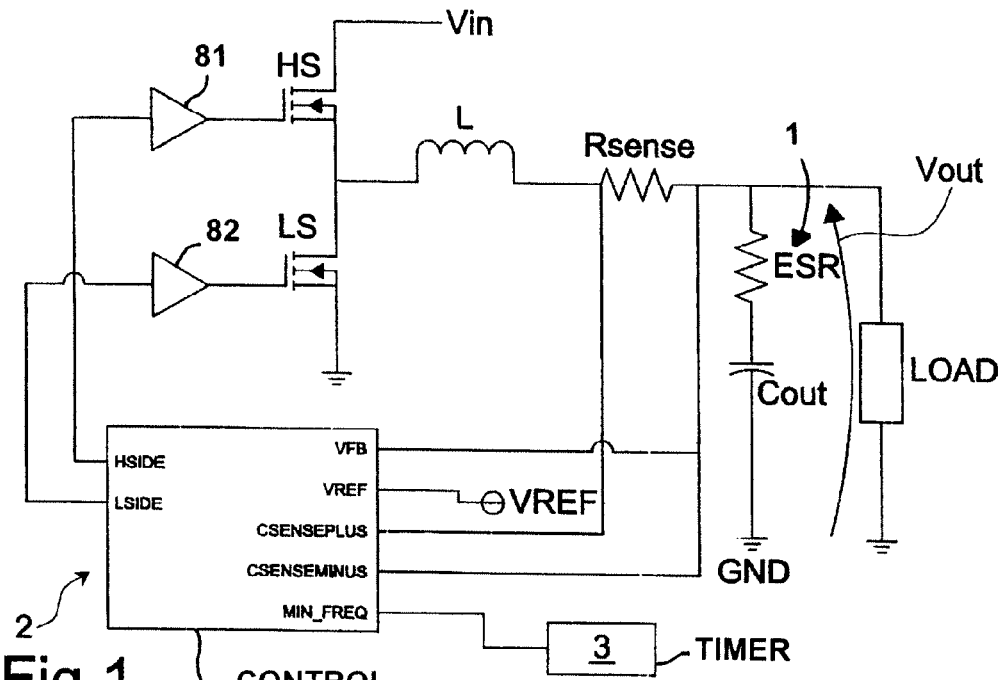
FIG. 1 shows a diagram of a switching converter with constant turn-on time and provided with a controller operating in pulse frequency mode in accordance with the known art.
Figure 2:
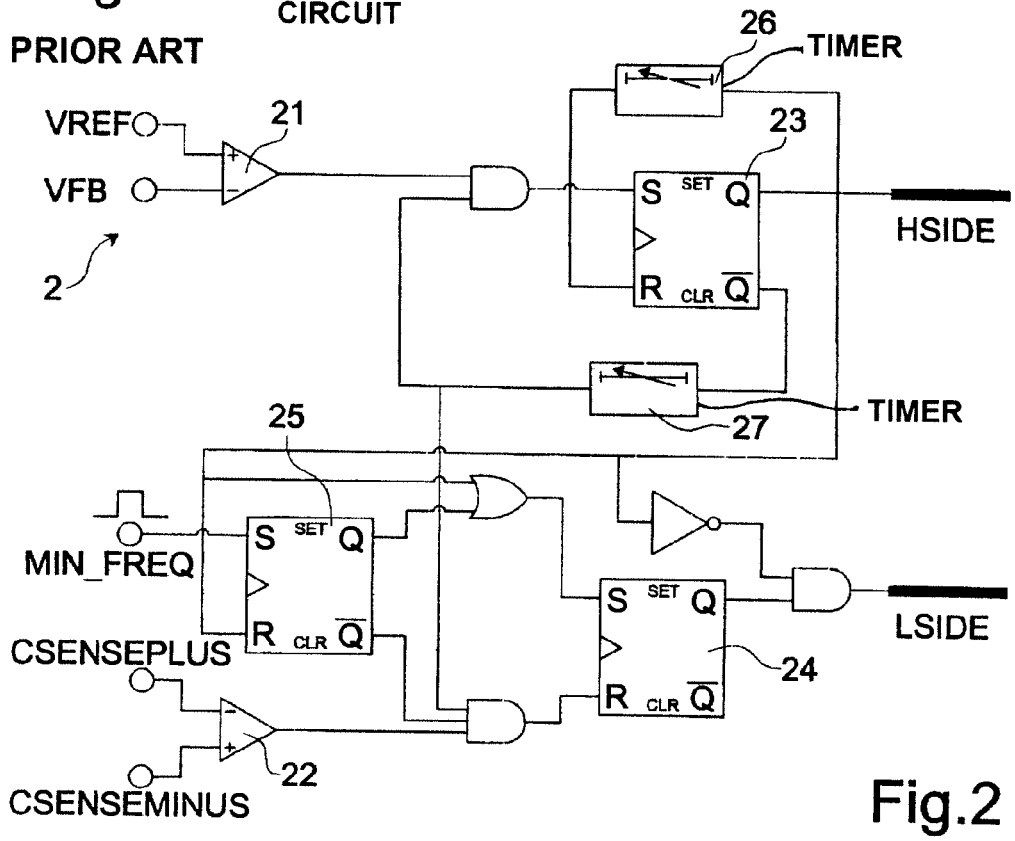
FIG. 2 is a more detailed diagram of the controller of FIG. 1.
Figure 3:
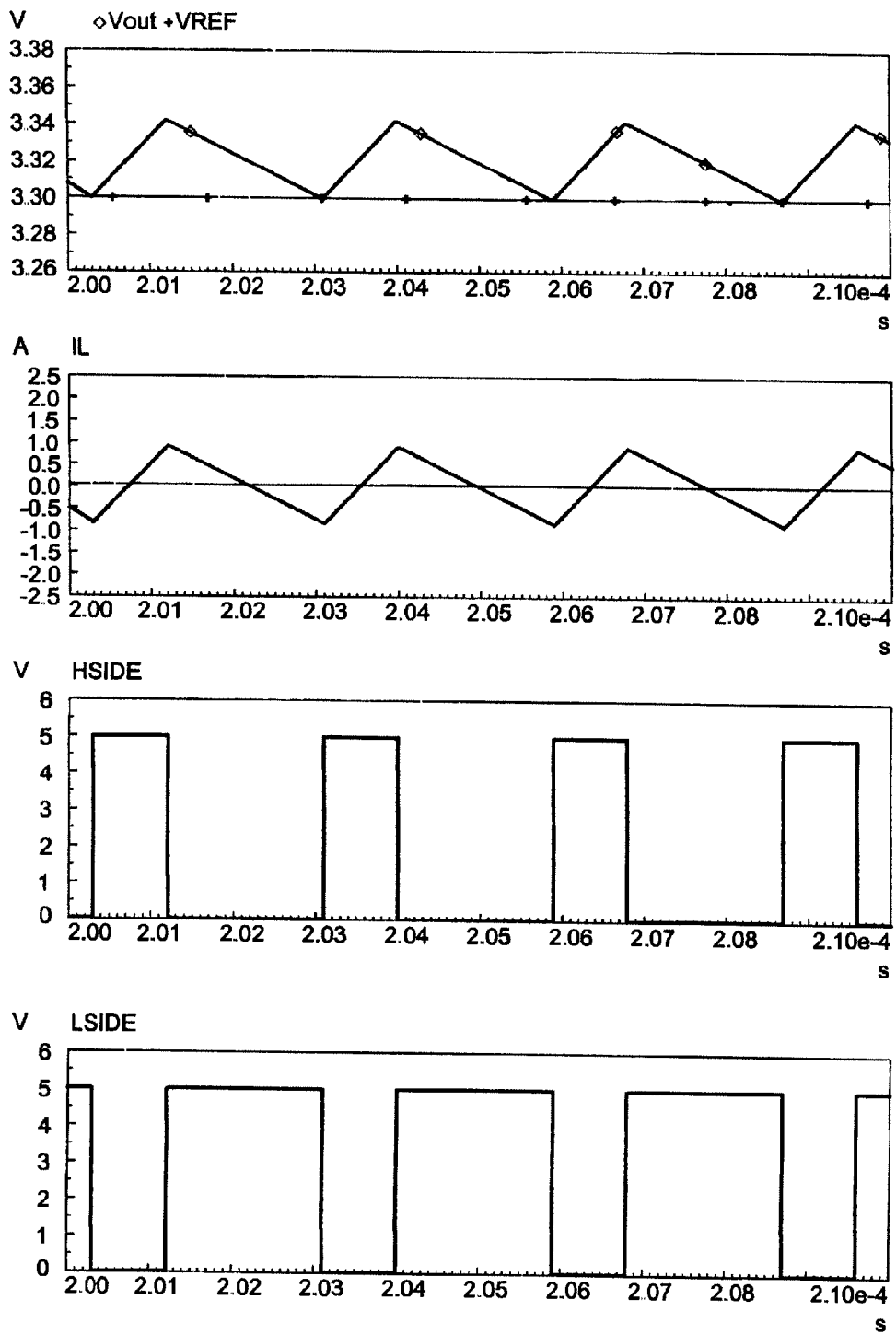
FIG. 3 shows time diagrams of signals in the converter of FIG. 1.
Figure 4:
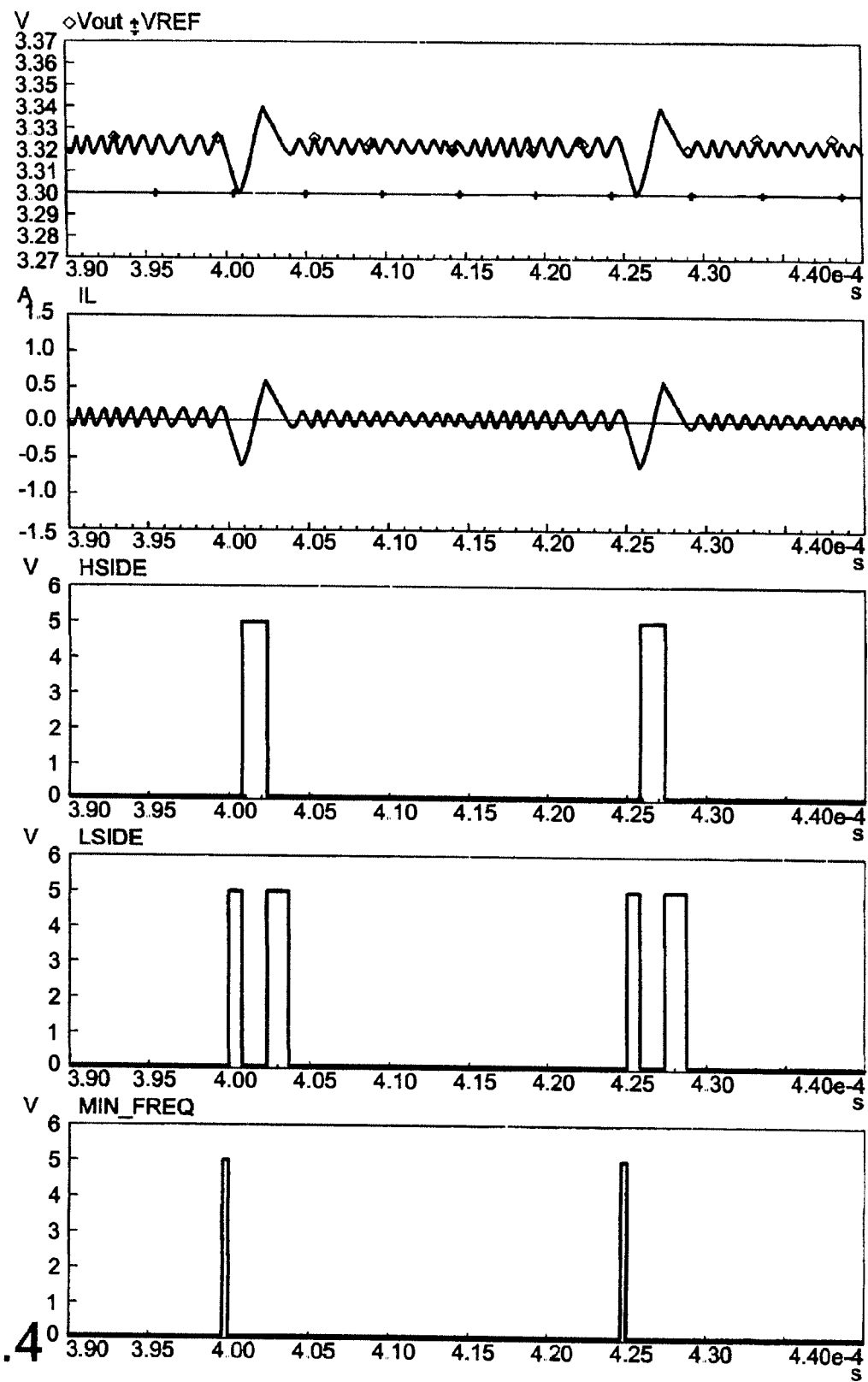
FIG. 4 shows time diagrams of signals in the converter of FIG. 1 with the activation of the flip-flop 25.
Figure 5:
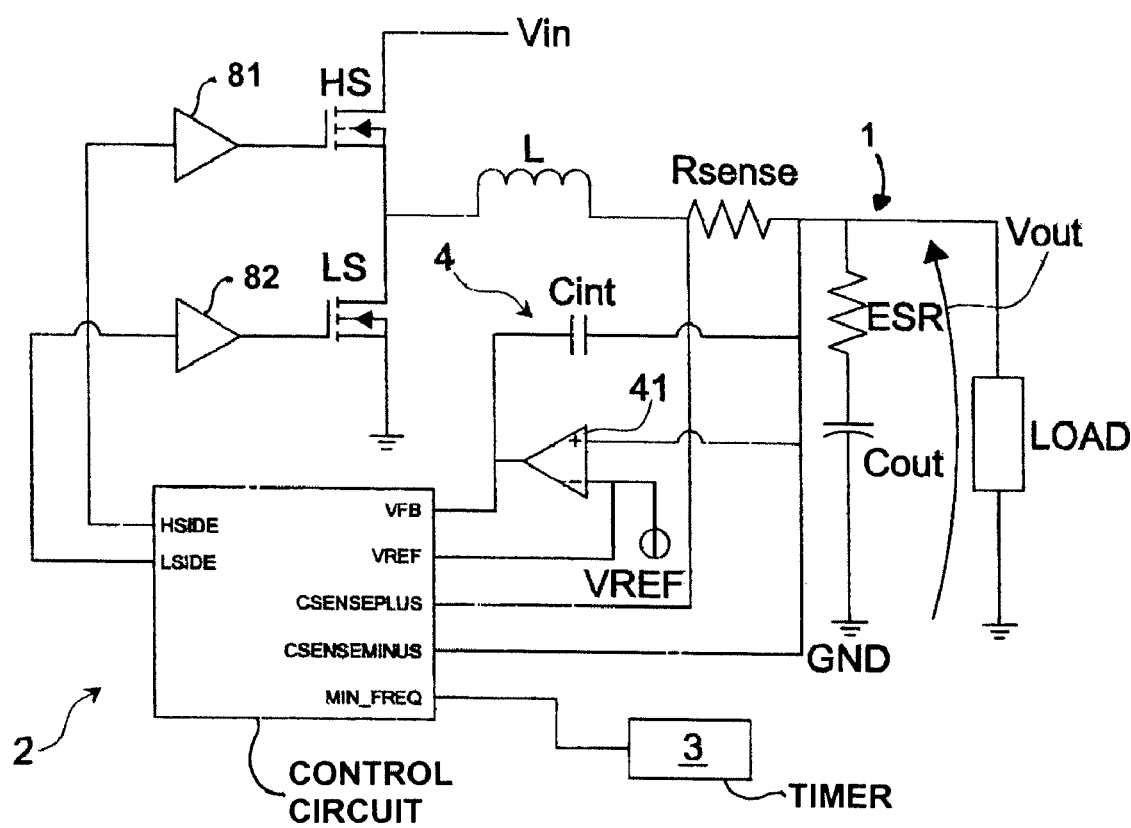
FIG. 5 shows a diagram of another switching converter with constant turn-on time and provided with a controller working in pulse frequency mode in accordance with the known art.
Figure 6:
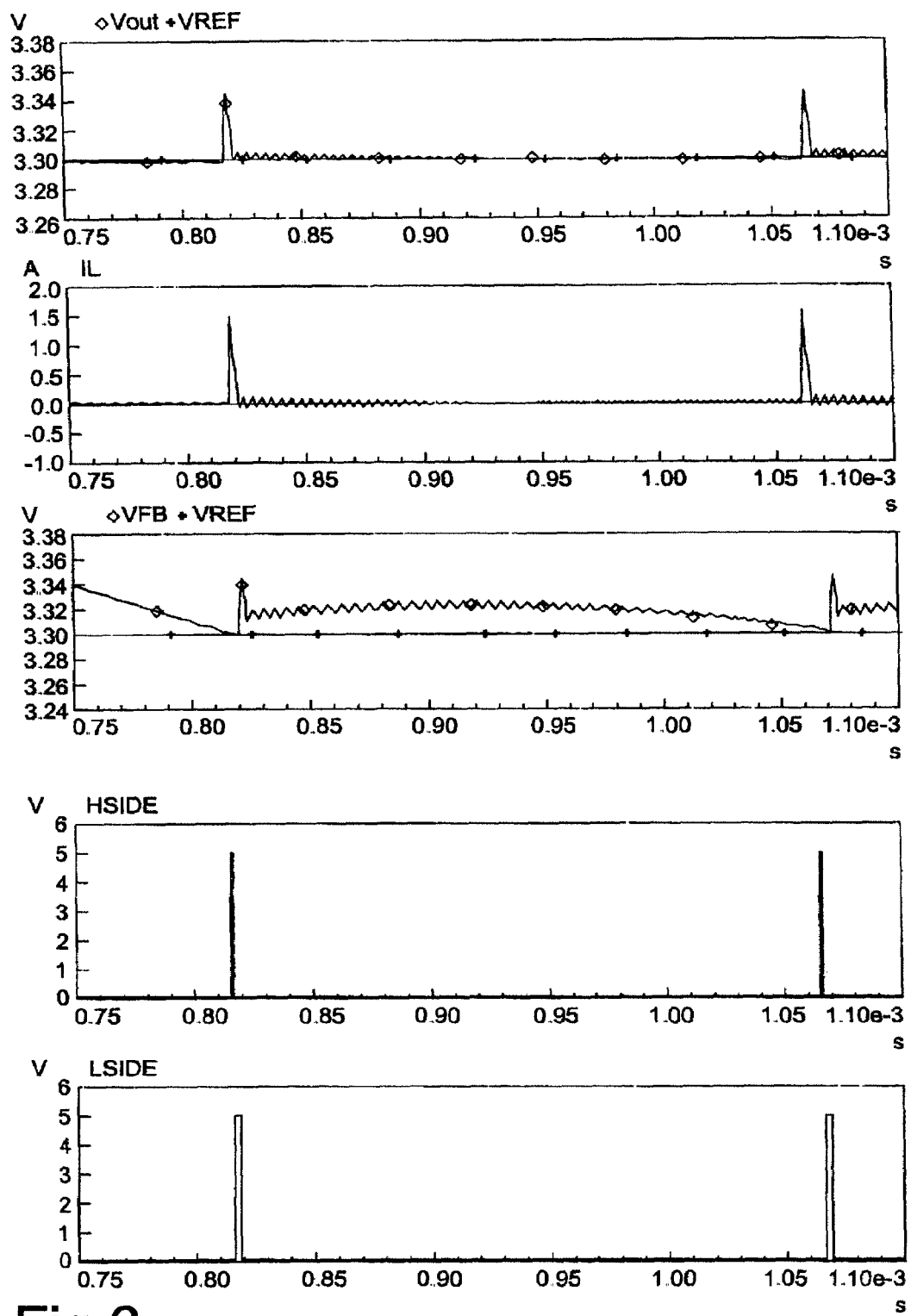
FIG. 6 shows time diagrams of signals in the converter of FIG. 5.
Figure 7:
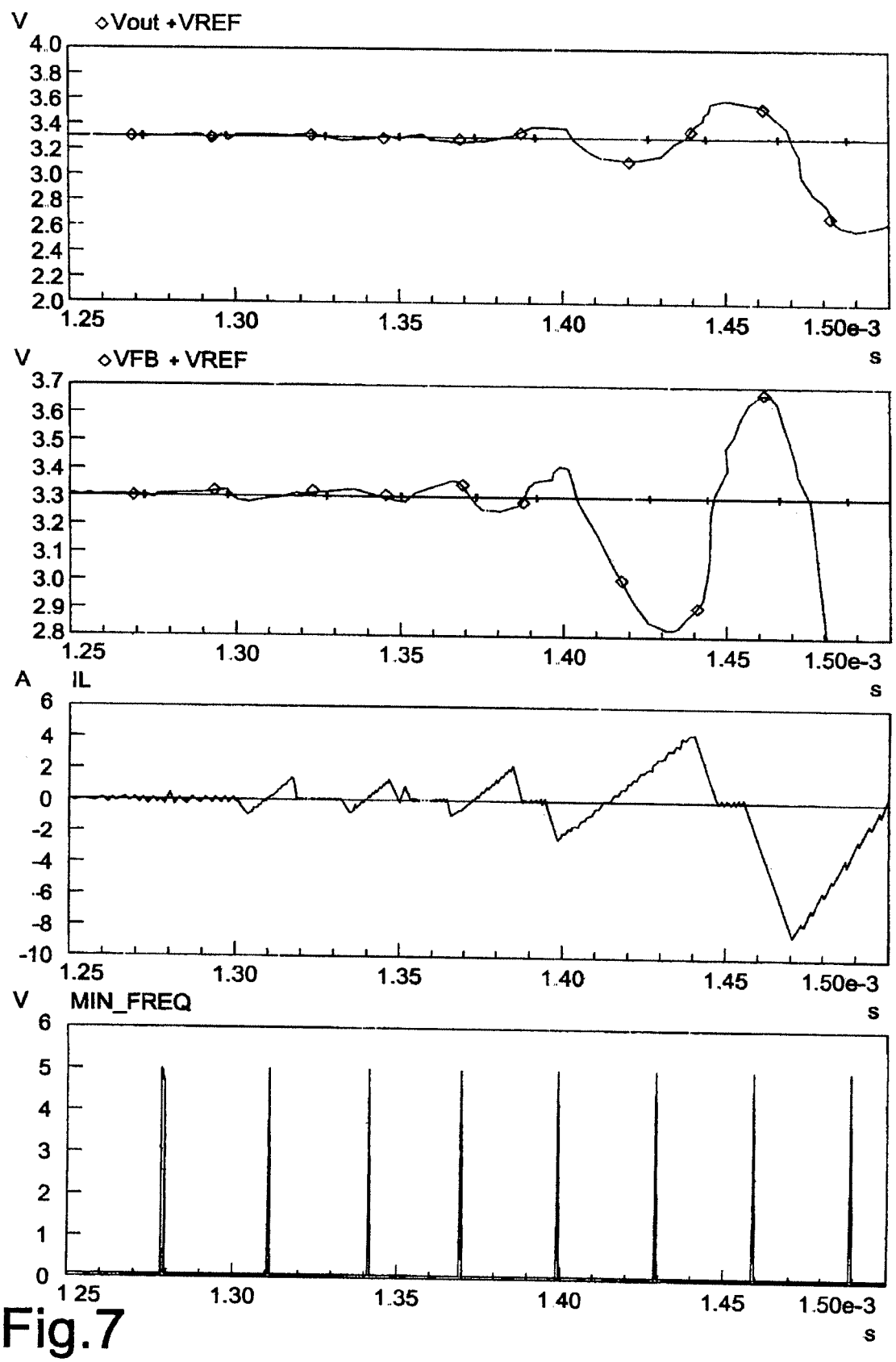
FIG. 7 shows time diagrams of signals in the converter of FIG. 5 if the converter is instable.
Figure 8:
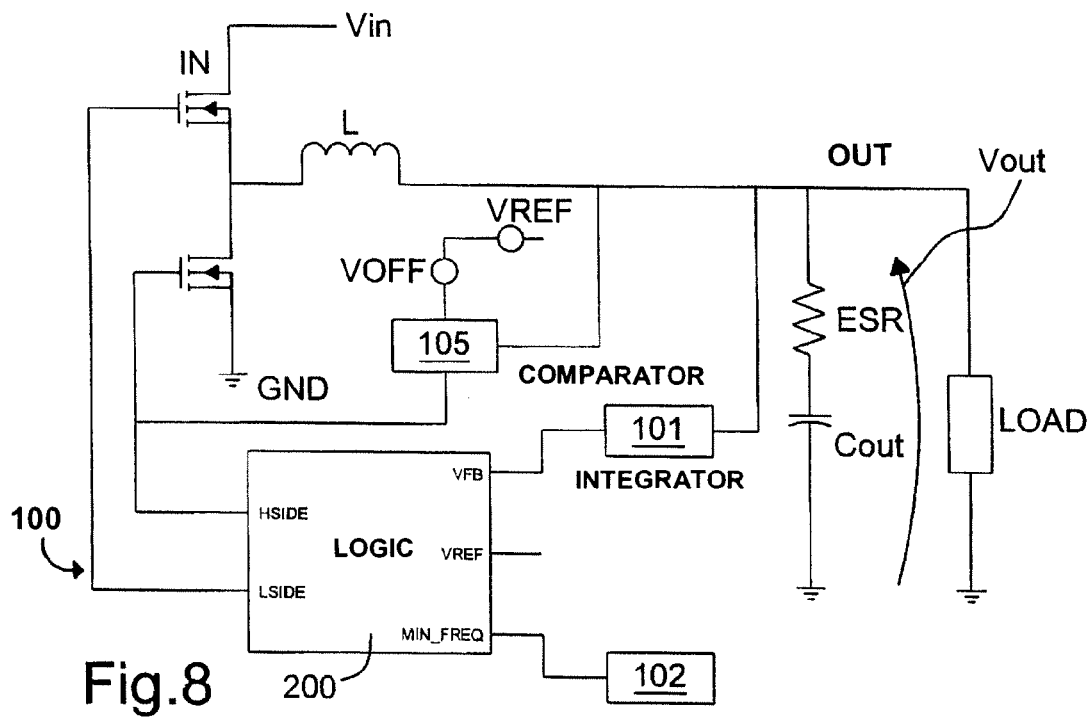
FIG. 8 is a diagram of a switching converter according to the present invention.

In FIG. 8 a switching converter is shown according to the present invention. The switching converter has an input terminal IN on which the voltage Vin is present and an output terminal OUT to which the load LOAD is coupled. The converter comprises a half-bridge of a first transistor HS and a second transistor LS coupled between the input terminal IN and a reference voltage, preferably ground GND, an inductance L coupled to the half-bridge and to the output terminal OUT, a control device 100 comprising means capable of detecting a signal Vout on the output terminal OUT of the converter. The control device comprises an integrator 101 suitable for integrating the signal detected Vout and a device 102 suitable for imposing a preset minimum frequency to the signal detected Vout. The control device 100 is suitable for carrying out a regulation on the average value of said signal detected Vout and on the minimum value of the signal VFB and for driving said first HS and second LS transistor in function of said regulation. The control device 100 comprises a logic part 200 having in input the signal VFB in output from the integrator 101, the signal VREF and the signal MIN_FREQ in output from the device 102 and suitable for sending the signals LSIDE and HSIDE for driving the transistors HS and LS.

The control device 100 comprises means 105 suitable for disconnecting the integrator 101 when said device for limiting the frequency 102 is active.

Said means 105 can include a comparator suitable for comparing the voltage Vout with the reference voltage VREF and suitable for turning off the transistor LS, which has been switched on following a pulse MIN-FREQ, and starting up the successive cycle. In this manner the delay of the integrator is ignored.

The integrator 101 preferably comprises a transconductance amplifier 41 having the inverting input coupled to the reference voltage VREF and the non-inverting input coupled to the voltage Vout. The integrator comprises a capacitor Cint coupled between the voltage Vout and the output terminal of the amplifier 41 coupled to the control circuit 2 so that the voltage VFB is $$VFB = \frac{Gm}{sCint}(Vout - VREF) + Vout$$

where Gm is the transconductance gain of the amplifier 41.

In a preferred embodiment an offset voltage Voff is introduced into the reference voltage VREF at the input of the comparator 105; the voltage Voff has to compensate the existing offset voltage on the transconductance amplifier of the integrator 101 and a value of voltage Vt suitable for compensating the delay of the comparator due to its trigger time. This is because the effect of a trigger voltage of the comparator that is lower than that of regulation causes an instability similar to that given by the delay of the integrator itself.

Figure 9:
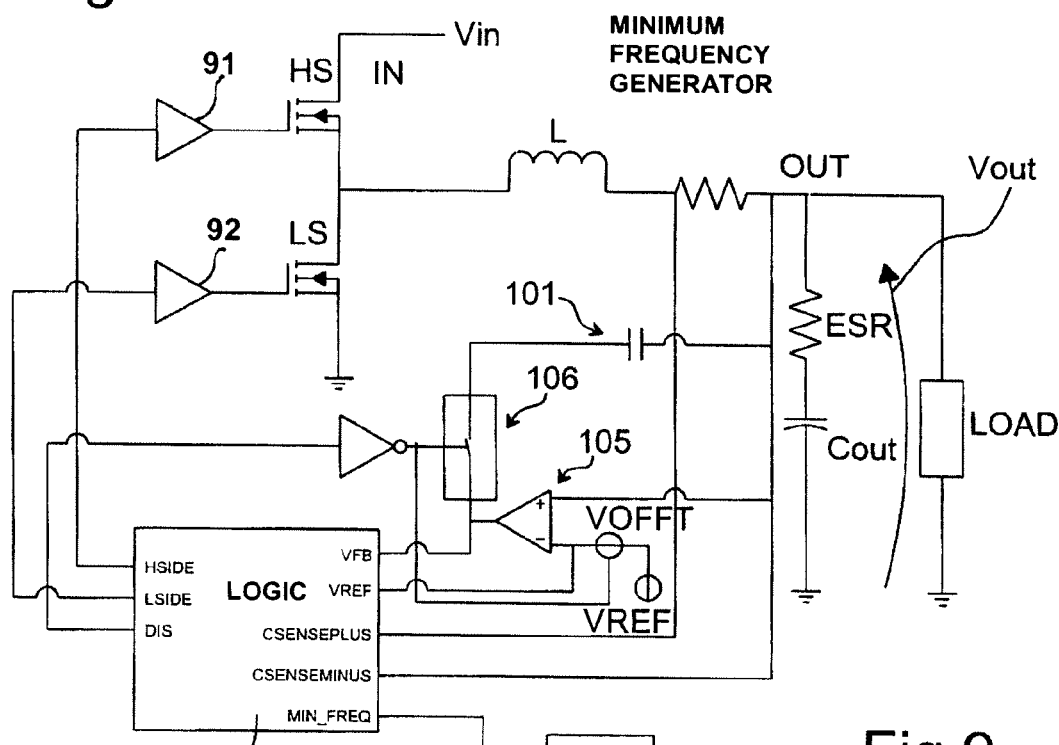
FIG. 9 is a diagram of a variant of the converter of FIG. 8.

In another preferred embodiment of the invention, visible in FIG. 9, the means 105 comprise a switch 106 placed between a terminal of the capacitance Cint and the output terminal of the transconductance amplifier 41. The switch is suitable for disconnecting the capacitance Cint when the transistor LS is turned on by means of the signal MIN_FREQ; the switch is commanded by the signal Dis coming from the logical part 200. In this manner the transconductance amplifier 41 acts, together with the capacitance Cint, as an integrator to correct the error given by half ripple on the output voltage Vout and acts as a comparator when the capacitance Cint is disconnected from the output terminal of the amplifier 41; it is not necessary to carry out a compensation of the offset voltage of the amplifier given that the same amplifier is used as an integrator and as a comparator. Transistors HS and LS are driven through buffers 91 and 92.

Figure 10:
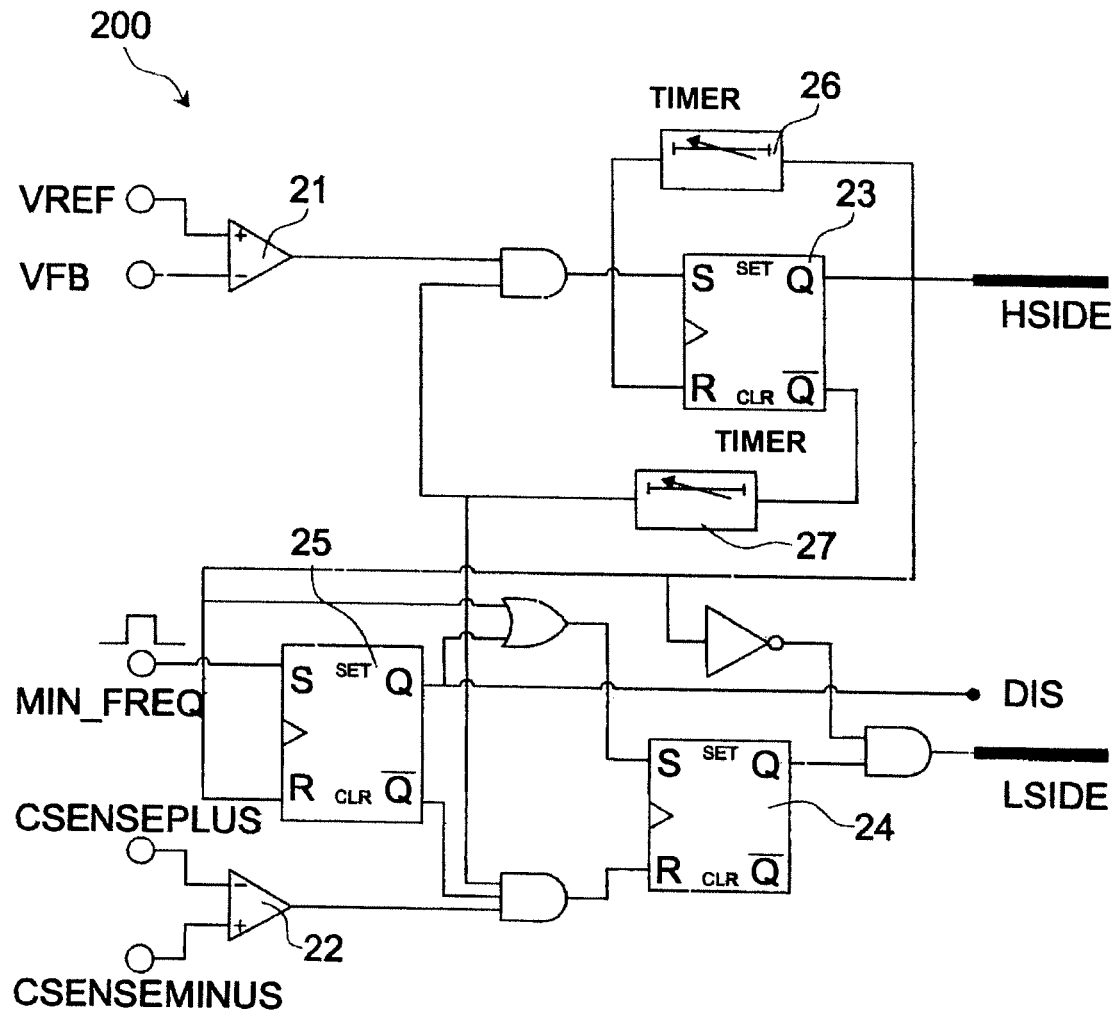
FIG. 10 is a detailed diagram of a part of the control device of FIG. 9.

The logical part 200 of the control device 100 can be seen better in FIG. 10. The logical part comprises a comparator 21 suitable for comparing the voltage VFB, present on the terminal VFB, with the voltage VREF, a comparator 22 having the input terminals coinciding with the terminals CSENSEPLUS and CSENSEMINUS, that is the terminals of a resistance Rsense placed between the inductance L and the terminal OUT, and suitable for detecting the zero crossing of the current that flows through the inductance L and three set-reset flip-flops 23-25 in which the flip-flop 23 has the set input S coupled with the output of the comparator 21, the flip-flop 24 has the reset input R coupled with the output of the comparator 22 and the flip-flop 25 has the set input S coupled with the output of the timer 3. The outputs of the flip-flops 23 and 24 are respectively the drive signals HSIDE and LSIDE for the transistors HS and LS. The circuit 100 also comprises a timer 26 which when the input is at a low logic level has a low output. Initially the set-reset flip-flops 23 and 25 are reset while the flip-flop 24 is set. When the signal VFB falls below the value VREF the comparator 21 sets the flip-flop 23; in this manner the signal HSIDE is raised while the signal LSIDE is lowered and the voltage Vout rises above the value of the voltage VREF. After a period given by the turn-on time Ton of the transistor HS the timer 26 changes the signal in output taking it to a high logic level; said signal resets the flip-flop 23 which in turn lowers the signal HSIDE and raises the signal LSIDE. The circuit 100 also comprises a timer 27 suitable for establishing the minimum turn-off time Toff of the transistor HS; in this manner the stability is assured in relation to the noise induced by the switching of the transistors HS and LS. The signal Dis is the signal Q in output from the flip-flop 25.

Figure 11:
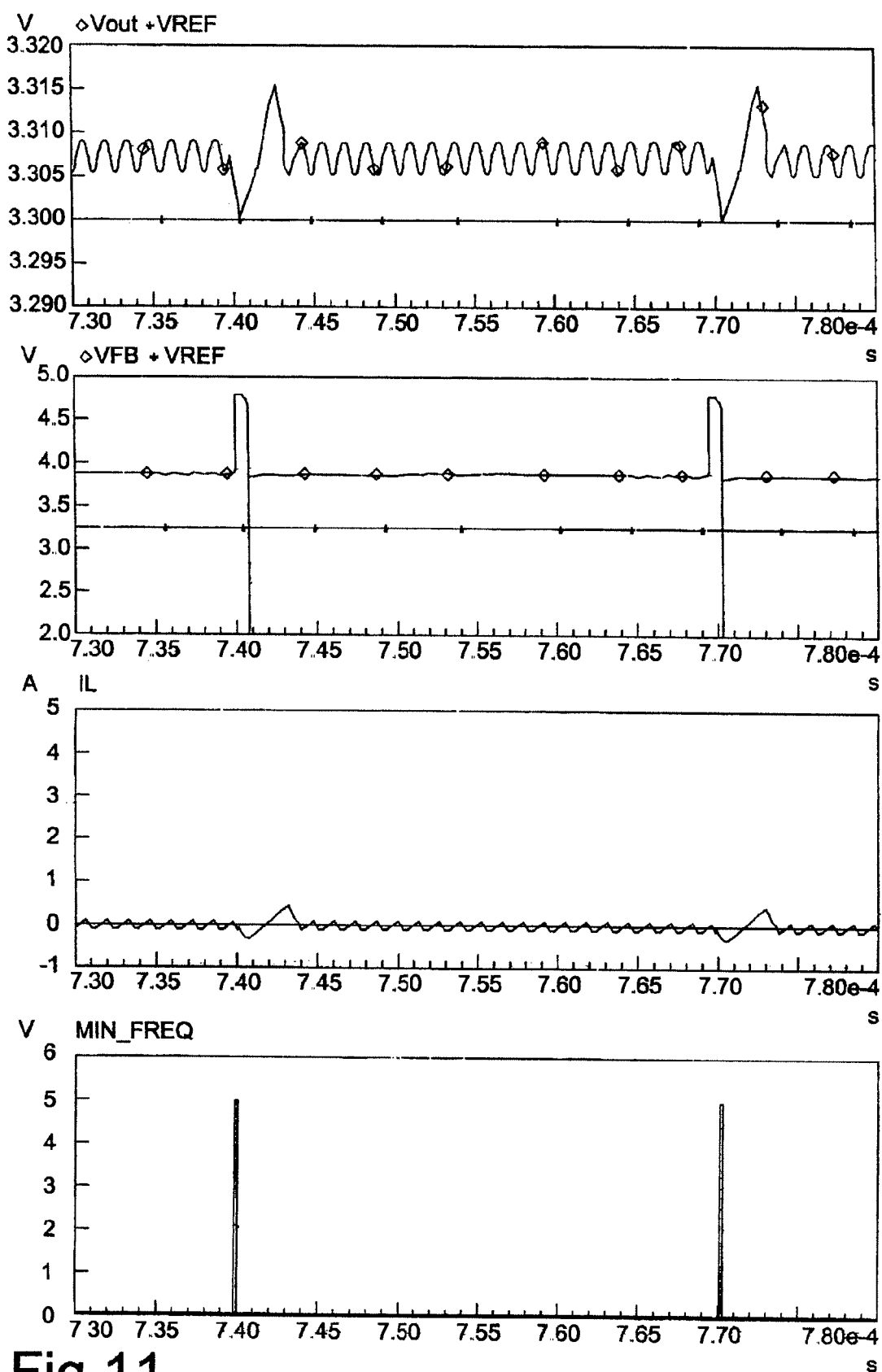
FIG. 11 shows time diagrams of signals in the converter of FIG. 9.
Figure 12:
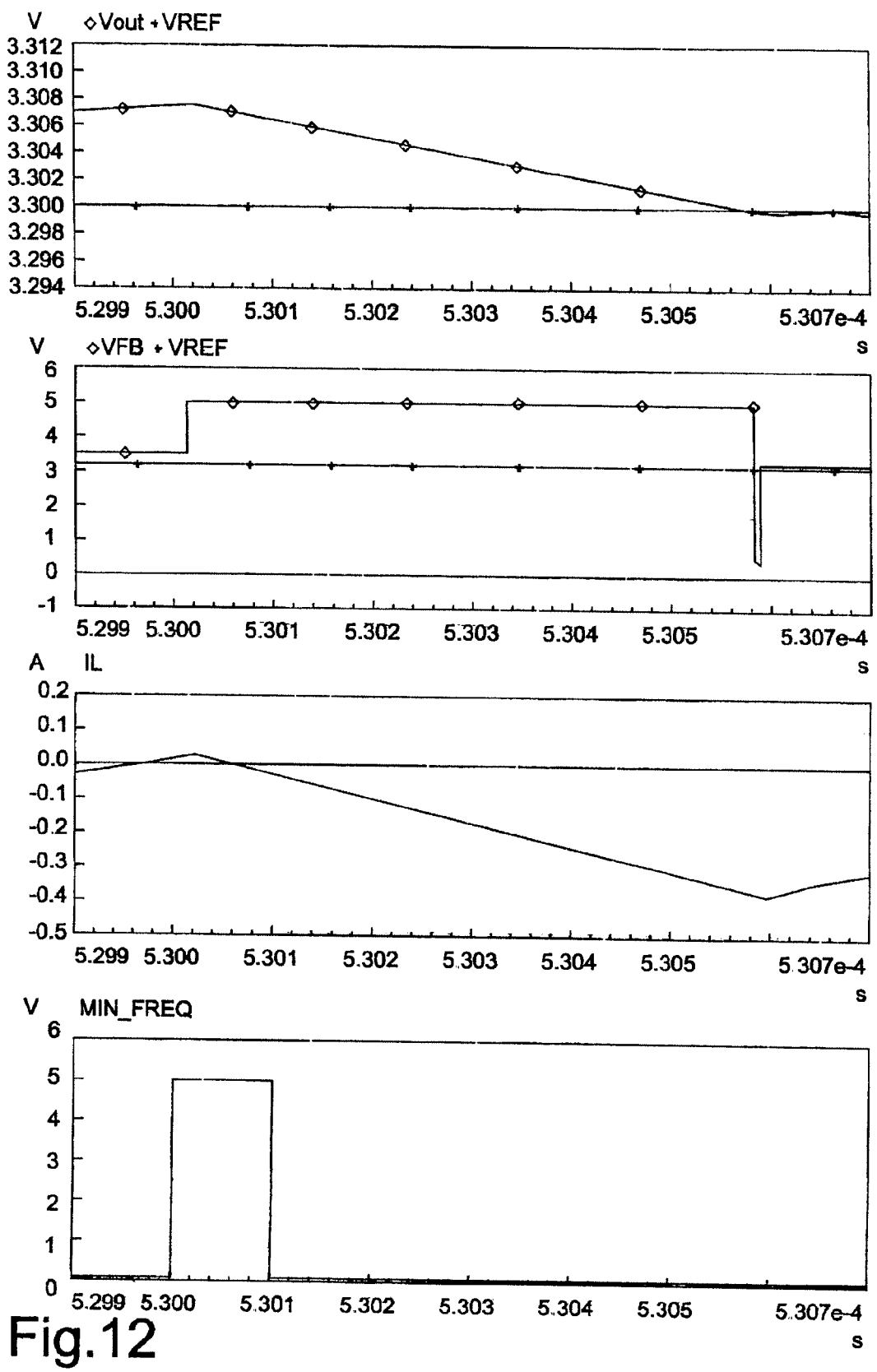
FIG. 12 shows the time diagrams of the signals of FIG. 10 in a particular period of time.

In FIG. 11 the time diagrams of the signals Vout, VFB, VREF, IL and MIN_FREQ are shown; it can be observed that the regulation of the output voltage Vout comes about on the minimum value or downstream. In FIG. 12 the trigger instant of the amplifier 41 is highlighted.

It is possible to compensate the delay of the comparator by introducing a suitable systematic offset which is active only when the comparator is used. For this purpose it is necessary to introduce an additional voltage Vofft to the voltage VREf as shown in FIG. 9.

It is also possible to add a clamp circuit suitable for limiting the charge voltage of the capacitance Cint.

If the load LOAD is so low that the current $$Iload = fpmin * Q = fpmin * \frac{1}{2}\frac{Vin - Vout}{L}\frac{Vin}{Vout}Ton^2$$

where fpmin is the minimum pulse frequency we have the coexistence of frequency limitation cycles with activation of the transistor LS and pulse frequency modulation cycles with activation of the transistor HS. This can cause oscillations in the frequency of repetition of the cycles that could lead to beating in the range of the audible frequencies.

To avoid said problem it is possible to increase the turn-on time Ton by a period Dton only after the turn-on of the transistor LS due to a pulse MIN_FREQ. Given that the current Iload depends on the square of Ton this introduces a hysteresis on the load current between the input and the output in frequency limitation mode.

Therefore if the frequency limitation cycle is entered with a current $$Iload = fpmin * Q = fpmin * \frac{1}{2}\frac{Vin - Vout}{L}\frac{Vin}{Vout}Ton^2,$$

after the turn-on of the transistor LS with a pulse MIN_FREQ, the current Iload becomes $$Iloadnew = fpmin * Q = fpmin * \frac{1}{2}\frac{Vin - Vout}{L}\frac{Vin}{Vout}(Ton + Dton)^2$$

and therefore in order to return in pulse frequency modulation mode the current of the load should ideally exceed the value Iloadnew.

Figure 13:
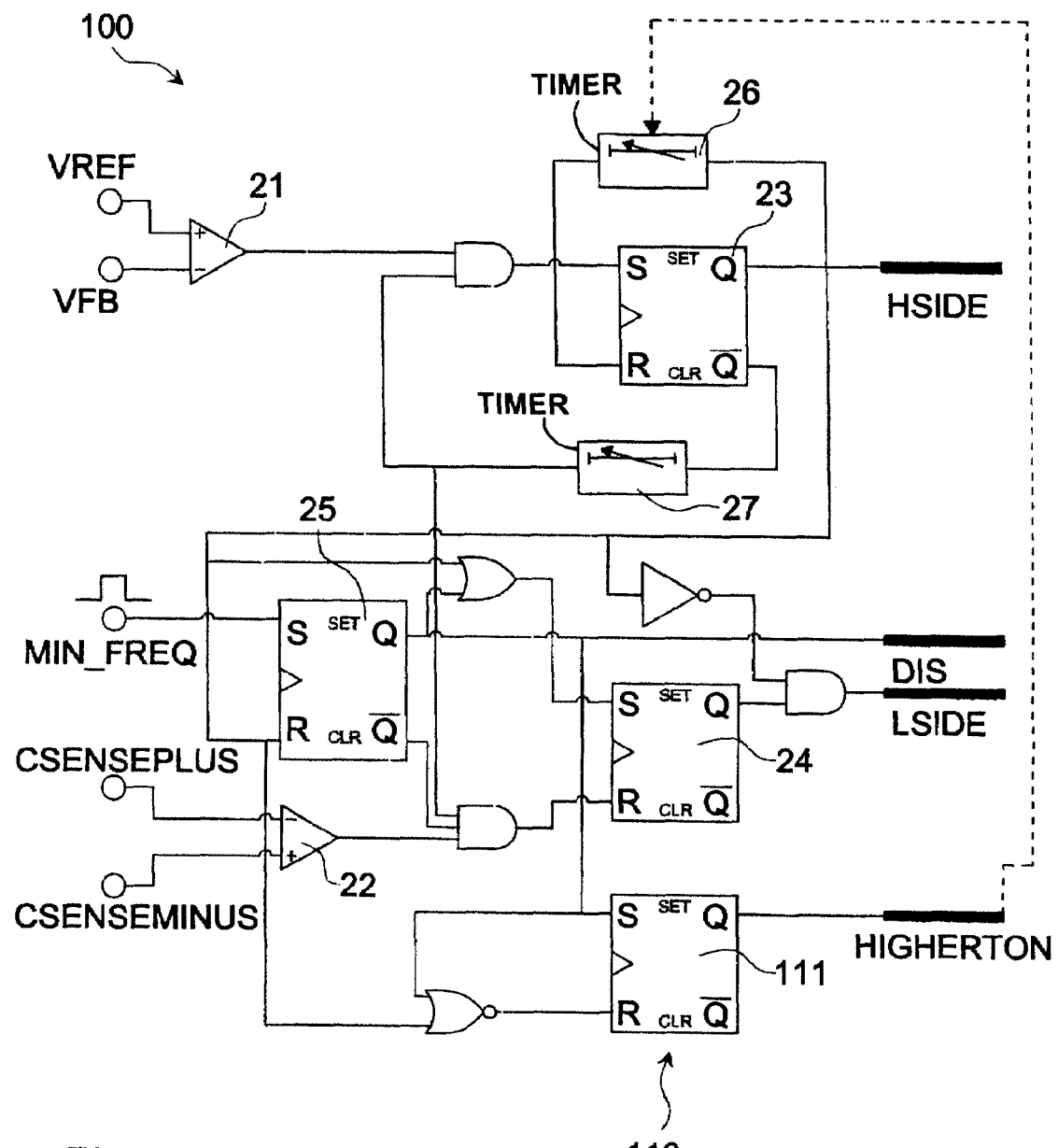
FIG. 13 shows a detailed diagram of a part of the control device according to a variant on the present invention.

In FIG. 13 a modified control device 100 is shown that comprises means 110 for increasing the turn-on time Ton by a time period Dton after the turn-on of the transistor LS following a pulse MIN_FREQ. Said means 110 comprise a set-reset flip-flop 111 which is set with the sending of the pulse MIN_FREQ and is reset at the successive turn-off of the transistor LS. The output HIGHERTON of the flip-flop 111 works on the timer 26 to increase its output by the time period Dton.

While there have been described above the principles of the present invention in conjunction with specific memory architectures and methods of operation, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicant hereby reserves the right to formulate new claims to such features and/or combinations of such features during the prosecution of the present application or of any further application derived therefrom.

We claim:

1. A control device for a switching converter having an input terminal, an output terminal, and a half-bridge of a first and a second transistor coupled between the input terminal and a reference voltage, said control device comprising:
   means for detecting a signal on the output terminal of the converter;
   means for integrating said detected signal;
   means for imposing a predefined minimum frequency of the detected signal;
   means for carrying out a regulation on the average value of said detected signal by comparison with a reference signal;
   means for driving said first and second transistor in performing said regulation; and
   means for turning off said means for integrating said detected signal when said means for imposing a predefined minimum frequency of the detected signal is active.

2. The device according to claim 1, wherein said means for turning off said means for integrating said detected signal comprises a comparator for comparing said detected signal with said reference signal and for turning off said second transistor.

3. The device according to claim 2, wherein said means for integrating said detected signal comprises an integrator and said integrator comprises a transconductance amplifier, and wherein said control device further comprises means for adding a preset voltage signal to said reference signal in input to the comparator and for compensating the offset voltage of said transconductance amplifier.

4. The device according to claim 3, further comprising means for adding a further preset voltage signal to said reference signal for compensating the delay time period of the comparator due to its trigger time.

5. The device according to claim 1, wherein said means suitable for integrating said detected signal comprises an amplifier and an integration capacitance coupled to said amplifier, and said means for turning off said means for integrating said detected signal comprises interruption means interposed between said amplifier and said integration capacitance.

6. The device according to claim 5, wherein said means suitable for integrating said detected signal comprises a transconductance amplifier having input terminals coupled to said reference signal and said detected signal and a capacitor coupled to an output terminal of said transconductance amplifier, said means for turning off said means for integrating said detected signal comprising a switch.

7. The device according to claim 6, wherein means suitable for commanding the opening of said switch comprises a set reset flip-flop.

8. The device according to claim 1, further comprising means for increasing the turn-on time period of the first transistor after the activation of said means for imposing a predefined minimum frequency of the detected signal.

9. The device according to claim 8, further comprising a timer suitable for determining the turn-on period of the first transistor and said means suitable for increasing the turn-on time period of the first transistor comprises a set-reset flip-flop set by the output signal of said second means and suitable for commanding said timer to increase by a given time period said turn-on time period.

10. A switching converter having an input terminal and an output terminal, said converter comprising a half-bridge of a first and a second transistor coupled between the input terminal and a reference voltage, and a control device comprising:
    means capable of detecting a signal on the output terminal of the converter;
    first means for integrating the detected signal;
    second means for imposing a predefined minimum frequency of the detected signal;
    means for carrying out a regulation on the average value of said signal detected by comparison with a reference signal and being suitable for driving said first and second transistor during said regulation; and
    means for turning off said first means when said second means is active.

11. The converter according to claim 10, wherein said means for turning off said first means comprises a comparator suitable for comparing said detected signal with said reference signal and for turning off said second transistor.

12. The converter according to claim 11, wherein said first means comprises an integrator and said integrator comprises a transconductance amplifier, said control device comprising other means for adding a preset voltage signal to said reference signal in input to the comparator and for compensating the offset voltage of said transconductance amplifier.

13. The converter according to claim 12, wherein said control device comprises other means for adding a further preset voltage signal to said reference signal and for compensating the delay time period of the comparator due to its trigger time.

14. The converter according to claim 10, wherein said means for integrating said signal detected comprises an amplifier and an integration capacitance coupled to said amplifier and said further means comprises interruption means interposed between said amplifier and said integration capacitance and means for commanding the opening of said interruption means when said second means is active.

15. The converter according to claim 14, wherein said integrator comprises a transconductance amplifier having input terminals coupled to said reference signal and to said detected signal and a capacitor coupled to the output terminal of said transconductance amplifier, said further means comprising a switch placed between said capacitor and the output terminal of said transconductance amplifier and means for commanding the opening of said switch when said second means are active.

16. The converter according to claim 15, wherein said means suitable for commanding the opening of said switch comprises a set-reset flip-flop having the output signal of said second means on the set input, the output signal of said flip-flop being suitable for commanding said switch.

17. The converter according to claim 10, wherein said control device comprises means for increasing the turn-on time period of the first transistor after the activation of said second means.

18. The converter according to claim 17, wherein said control device comprises a timer suitable for determining the turn-on period of the first transistor and in that said means for increasing the turn-on time period of the first transistor comprises a set-reset flip-flop set by the output signal of said second means and for commanding said timer to increase by a given time period said turn-on time period.

19. A method of operating a control device for a switching converter having an input terminal, an output terminal, and a half-bridge of a first and a second transistor coupled between the input terminal and a reference voltage, the method comprising:
- detecting a signal on the output terminal of the converter;
- integrating the detected signal;
- selectively imposing a predefined minimum frequency of the detected signal;
- regulating the average value of said detected signal by comparison with a reference signal;
- driving said first and second transistor in performing the regulation; and
- turning off the integration of the detected signal when imposing a predefined minimum frequency of the detected signal is active.

20. The method of claim 19 further comprising comparing the detected signal with the reference signal for turning off the second transistor.

* * * * *

UNITED STATES PATENT AND TRADEMARK OFFICE
CERTIFICATE OF CORRECTION

PATENT NO. : 7,570,032 B2 Page 1 of 1
APPLICATION NO. : 11/548996
DATED : August 4, 2009
INVENTOR(S) : Adalberto Mariani et al.

It is certified that error appears in the above-identified patent and that said Letters Patent is hereby corrected as shown below:

Title Page, (54) Title should read: CONTROL DEVICE FOR SWITCHING CONVERTER AND SWITCHING CONVERTER INCORPORATING SAME Signed and Sealed this First Day of December, 2009

David J. Kappos
*Director of the United States Patent and Trademark Office*

UNITED STATES PATENT AND TRADEMARK OFFICE
CERTIFICATE OF CORRECTION

PATENT NO.        : 7,570,032 B2                                     Page 1 of 1
APPLICATION NO. : 11/548996
DATED             : August 4, 2009
INVENTOR(S)       : Adalberto Mariani et al.

It is certified that error appears in the above-identified patent and that said Letters Patent is hereby corrected as shown below:

Title Page, (54) and at Column 1, lines 1 and 2, Title should read: CONTROL DEVICE FOR SWITCHING CONVERTER AND SWITCHING CONVERTER INCORPORATING SAME This certificate supersedes the Certificate of Correction issued December 1, 2009.

Signed and Sealed this

Twenty-ninth Day of December, 2009

David J. Kappos
*Director of the United States Patent and Trademark Office*